United States Patent
Xu et al.

(10) Patent No.: US 10,970,819 B2
(45) Date of Patent: Apr. 6, 2021

(54) IMAGE PROCESSING DEVICE, IMAGE PROCESSING METHOD, AND IMAGE PROCESSING PROGRAM

(71) Applicant: Rakuten, Inc., Tokyo (JP)

(72) Inventors: Jiu Xu, Tokyo (JP); Bjoern Dietmar Rafael Stenger, Tokyo (JP); Yeongnam Chae, Tokyo (JP)

(73) Assignee: Rakuten, Inc., Tokyo (JP)

( * ) Notice: Subject to any disclaimer, the term of this patent is extended or adjusted under 35 U.S.C. 154(b) by 256 days.

(21) Appl. No.: 16/083,049

(22) PCT Filed: May 26, 2017

(86) PCT No.: PCT/JP2017/019738
§ 371 (c)(1),
(2) Date: Sep. 7, 2018

(87) PCT Pub. No.: WO2018/216207
PCT Pub. Date: Nov. 29, 2018

(65) Prior Publication Data
US 2020/0302576 A1 Sep. 24, 2020

(51) Int. Cl.
*G06T 3/40* (2006.01)
*G06N 3/08* (2006.01)

(52) U.S. Cl.
CPC ............ *G06T 3/4053* (2013.01); *G06N 3/08* (2013.01); *G06T 3/4046* (2013.01)

(58) Field of Classification Search
CPC ........ G06N 3/08; G06N 3/0454; G06N 3/084; G06K 9/46; G06K 9/00744; G06T 3/4046; G06T 9/002; G06T 2207/20084; G06T 3/4023; G06T 2207/20081; G06T 7/55; G06T 5/4053
See application file for complete search history.

(56) References Cited

U.S. PATENT DOCUMENTS

| | | | |
|---|---|---|---|
| 10,423,861 B2* | 9/2019 | Gao | G16B 40/00 |
| 10,751,548 B2* | 8/2020 | Han | G06K 9/3233 |
| 2016/0358070 A1* | 12/2016 | Brothers | G06N 3/0454 |
| 2017/0140260 A1* | 5/2017 | Manning | G10L 25/30 |
| 2018/0350110 A1* | 12/2018 | Cho | G06T 9/004 |
| 2018/0365794 A1* | 12/2018 | Lee | G06N 3/0481 |

OTHER PUBLICATIONS

Kim et al. Accurate Image Super-resolution Using Very Deep Convolutional Networks, 2016 IEEE CVPR Jun. 2016.*

(Continued)

*Primary Examiner* — Jingge Wu
(74) *Attorney, Agent, or Firm* — Sughrue Mion, PLLC

(57) ABSTRACT

An image processing device according to one embodiment includes a processor. The processor executes a step of acquiring an input image, a step of calculating a feature residual by processing the input image in a convolutional layer, a step of performing at least one convolution on the input image, a step of generating an output feature by applying the feature residual to the convolved input image, and a step of generating an image residual based on the output feature. The image residual is applied to the input image, and thereby a high-resolution image with higher resolution than the input image is generated.

6 Claims, 9 Drawing Sheets

(56) References Cited

OTHER PUBLICATIONS

International Preliminary Report on Patentability with a Translation of Written Opinion in International Application No. PCT/JP2017/019738, dated Dec. 5, 2019.

Christian Ledig et al., "Photo-Realistic Single Image Super-Resolution Using a Generative Adversarial Network," arXiv: 1609.04802, 2016, 19 pages.

Ze Yang, Kai Zhang, Yudong Liang, and Jinjun Wang, "Single Image Super-resolution with a Parameter Economic Residual-like Convolutional Neural Network", MMM 2017, Part 1, LNCS 10132, 2017, p. 353-p. 364, 13 pages total.

Chao Dong, Chen Change Loy, Kaiming He, and Xiaoou Tang, "Learning a Deep Convolutional Network for Image Super-Resolution", ECCV 2014, LNCS 8692, 2014, p. 184-p. 199, 20 pages total.

Yudong Liang, Radu Timofte, Jinjun Wang, Yihong Gong, and Nanning Zheng, "Single Image Super Resolution—When Model Adaptation Matters", Journal of Latex Class Files, vol. 14, No. 8, Aug. 2015, pp. 1-10, 11 pages total.

\* cited by examiner

IMAGE PROCESSING DEVICE, IMAGE PROCESSING METHOD, AND IMAGE PROCESSING PROGRAM

CROSS REFERENCE TO RELATED APPLICATIONS

This application is a National Stage of International Application No. PCT/JP2017/019738 filed May 26, 2017.

TECHNICAL FIELD

The present invention relates to an image processing device, an image processing method, and an image processing program.

BACKGROUND ART

A technique to enhance the resolution of an image by using machine learning is known. For example, the following Non Patent Literature 1 discloses SRGAN, which is Generative Adversarial Network (GAN) for super-resolution of images.

CITATION LIST

Non Patent Literature

NPL1: C. Ledig, L. Theis, F. Huszar, J. Caballero, A. Aitken, A. Tejani, J. Totz, Z. Wang, and W. Shi, "Photo-realistic single image super-resolution using a generative adversarial network," arXiv:1609.04802, 2016.

SUMMARY OF INVENTION

Technical Problem

One way to reduce a processing time is to perform super-resolution with the machine learning using a neural network including a bypass connection. If, however, a bypass connection is merely applied to super-resolution, there is a possibility that all gradients (interlayer coefficients) are 0, which can hinder the progress of machine learning for super-resolution. Thus, there is a demand for machine learning capable of performing super-resolution even when a difference in resolution between an input image and an output image is small.

Solution to Problem

An image processing device according to one aspect of the present invention is an image processing device including a processor, and the processor executes a step of acquiring an input image, a step of calculating a feature residual by processing the input image in a convolutional layer, a step of performing at least one convolution on the input image, a step of generating an output feature by applying the feature residual to the convolved input image, and a step of generating an image residual based on the output feature, wherein the image residual is applied to the input image, and thereby a high-resolution image with higher resolution than the input image is generated.

An image processing method according to one aspect of the present invention is an image processing method performed by an image processing device including a processor, the method including a step of acquiring an input image, a step of calculating a feature residual by processing the input image in a convolutional layer, a step of performing at least one convolution on the input image, a step of generating an output feature by applying the feature residual to the convolved input image, and a step of generating an image residual based on the output feature, wherein the image residual is applied to the input image, and thereby a high-resolution image with higher resolution than the input image is generated.

An image processing program according to one aspect of the present invention causes a computer to execute a step of acquiring an input image, a step of calculating a feature residual by processing the input image in a convolutional layer, a step of performing at least one convolution on the input image, a step of generating an output feature by applying the feature residual to the convolved input image, and a step of generating an image residual based on the output feature, wherein the image residual is applied to the input image, and thereby a high-resolution image with higher resolution than the input image is generated.

In the above aspects, processing that performs convolution on an input image and applies a feature residual to the convolved input image is performed without exception. By performing compulsory convolution of an input image, it is possible to prevent the situation where all gradients are 0, and it is therefore possible to achieve machine learning capable of performing super-resolution even when a difference in resolution between an input image and an output image is small.

Advantageous Effects of Invention

According to one aspect of the present invention, it is possible to achieve machine learning capable of performing super-resolution even when a difference in resolution between an input image and an output image is small.

ADVANTAGEOUS EFFECTS OF INVENTION

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

[Overview]

An image processing device 10 according to an embodiment is a computer or a computer system that performs super-resolution of an image by machine learning (to be more specific, deep learning).

"Image" is an image where an object is fixed on a certain medium so that it is perceivable by human eyes. The image becomes visually perceivable by processing data indicating an image (image data), which can be processed by a computer. To be specific, the image becomes visually perceivable by being recorded in a storage device such as a memory and output to an output device such as a monitor by processing of a processor. The image may be a still image or each frame that forms a moving image.

Figure 1:
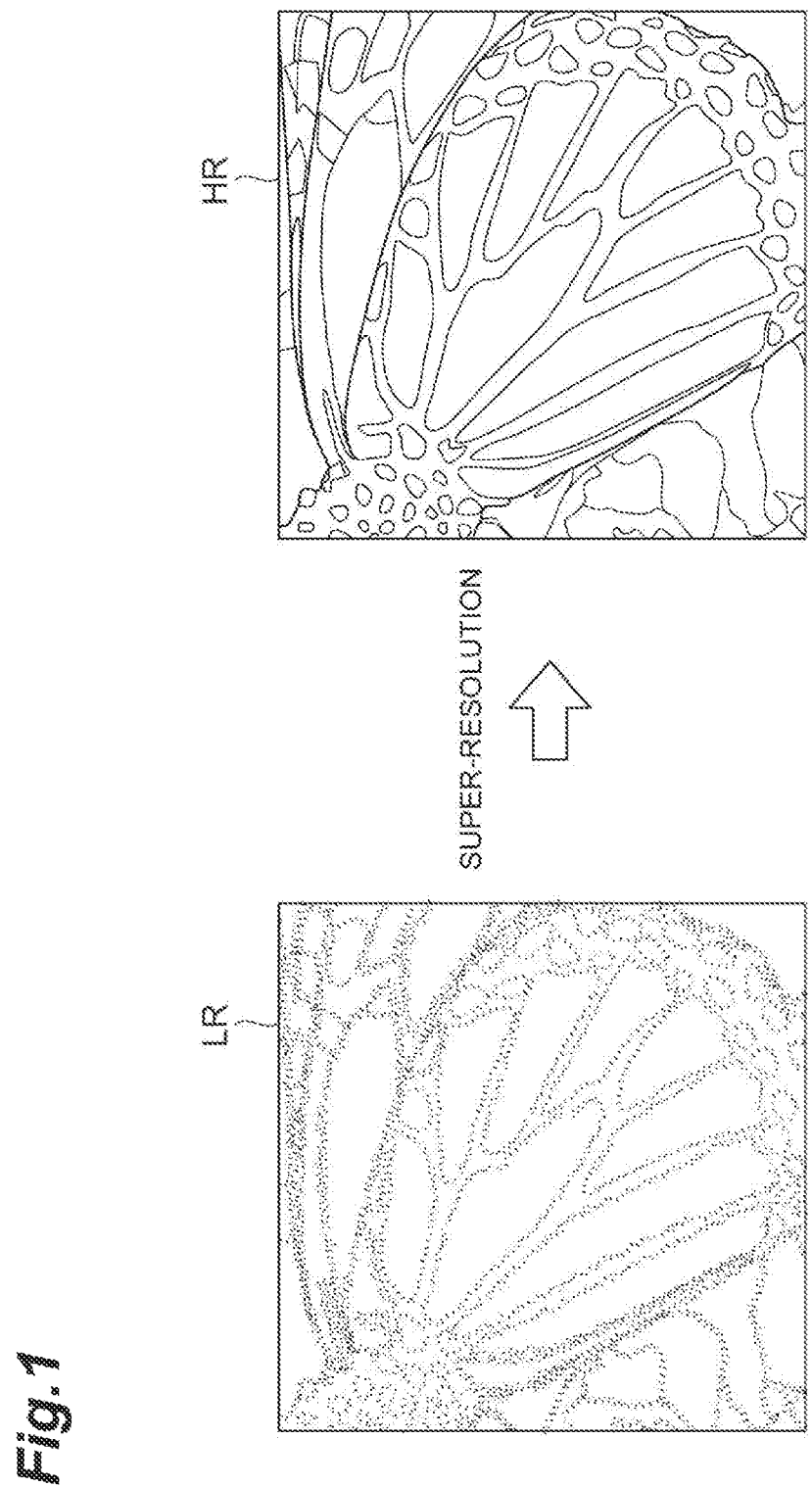
FIG. 1 is a view schematically showing an example of super-resolution.

"Super-resolution" is a technique that generates a high-resolution image from a low-resolution image (i.e., increases the resolution of an image). Note that "resolution" is a numerical value that represents the density of pixels in an image. For example, when the resolution of an input image is less than the resolution of a display device, super-resolution may be used to increase the resolution of the input image so as to comply with the resolution of the display device. Alternatively, when the resolution of an image to be used does not meet specified criteria, super-resolution may be used to increase the resolution of the image so as to satisfy the criteria. FIG. 1 schematically shows an example of super-resolution. In this example, a high-resolution image HR is obtained by performing super-resolution on a low-resolution image LR showing a butterfly wing. There are cases, however, where even when super-resolution is performed, the resolution does not substantially change or does not change at all, or the degree of change in resolution is so small that it cannot be recognized by human eyes.

The image processing device 10 performs super-resolution by machine learning (deep learning to be more specific). "Machine learning" is a technique that conducts repetitive learning based on given information to autonomously find a law or rule. It can be said that the machine learning is an approach that solves a problem by providing a computer with learning ability. "Deep learning" is machine learning using a multi-layer structure neural network (deep neural network). "Neural network" is a model of information processing that models the structure of the human brain nervous system.

The image processing device 10 autonomously generates a neural network for implementing super-resolution by conducting learning with use of a low-resolution image that is given as an input of machine learning and a high-resolution image that is given as an output (ground truth) of machine learning. Generally, the image processing device 10 processes a plurality of sets of low-resolution images and high-resolution images to repetitively learn the procedure of super-resolution. Further, the image processing device 10 uses the neural network to process a low-resolution image whose ground truth is unknown, and generates a high-resolution image corresponding to the low-resolution image (i.e., increases the resolution of an input image). One feature of the image processing device 10 according to this embodiment relates to the basic structure of a neural network for implementing super-resolution.

[Configuration of Device]

Figure 2:
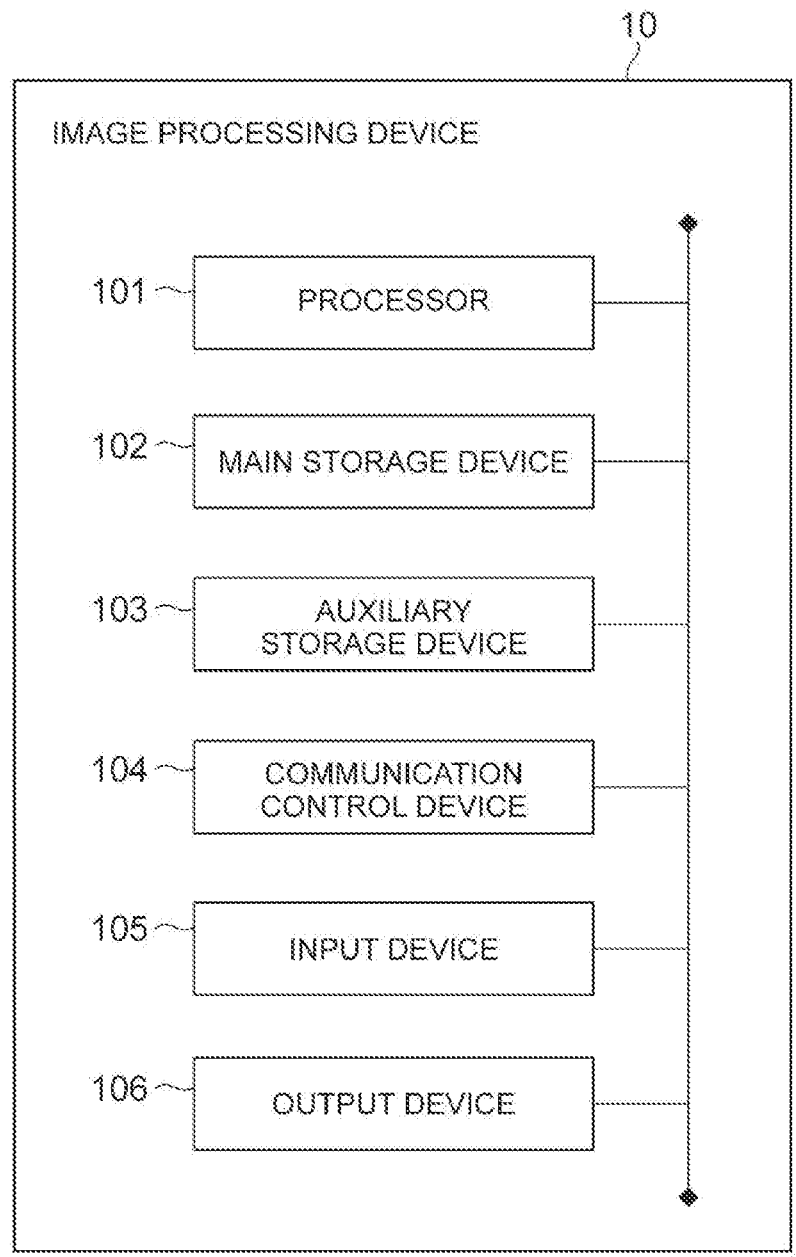
FIG. 2 is a view showing the hardware configuration of an image processing device according to an embodiment.

FIG. 2 shows a typical hardware configuration of the image processing device 10. The image processing device 10 includes a processor 101 that executes an operating system, an application program and the like, a main storage unit 102 such as ROM and RAM, an auxiliary storage unit 103 such as a hard disk or a flash memory, a communication control unit 104 such as a network card or a wireless communication module, an input device 105 such as a keyboard and a mouse, and an output device 106 such as a monitor. Examples of the processor 101 are CPU and GPU, and GPU, which is good at parallel computation, is generally used in deep learning that needs to execute a large amount of product-sum operation.

The functional elements of the image processing device 10 are implemented by loading given software (for example, an image processing program P1, which is described later) onto the processor 101 or the main storage device 102 and running the program. The processor 101 makes the communication control device 104, the input device 105 or the output device 106 operate in accordance with the software, and reads and writes data to and from the main storage device 102 or the auxiliary storage device 103. Data or databases required for the processing are stored in the main storage device 102 or the auxiliary storage device 103.

The image processing device 10 may be composed of a single computer or a plurality of computers. In the case of using a plurality of computers, those computers are connected through a communication network such as the Internet or an intranet, and thereby one image processing device 10 is logically constructed.

Figure 3:
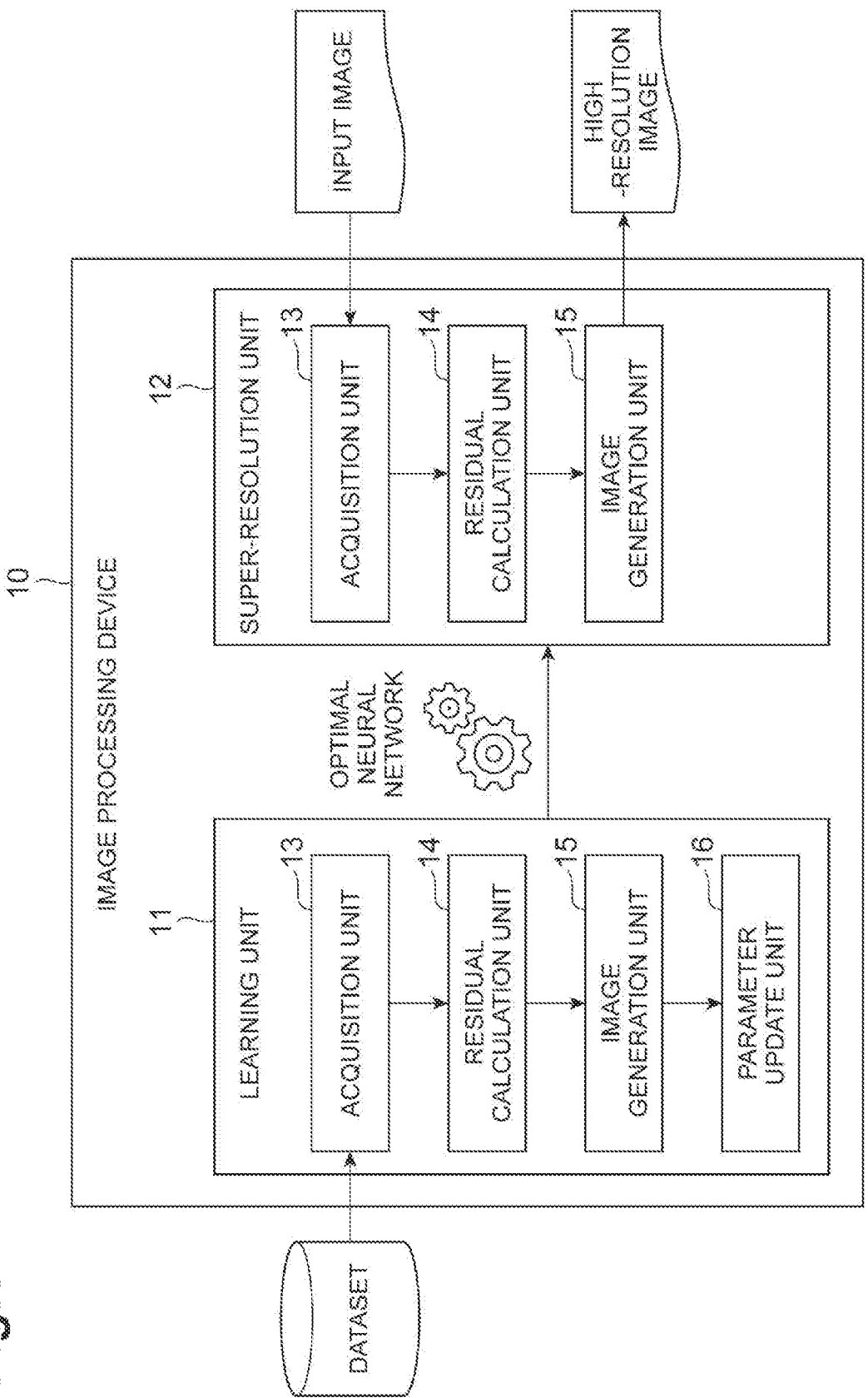
FIG. 3 is a view showing the functional configuration of the image processing device according to the embodiment.

FIG. 3 shows the functional configuration of the image processing device 10. The image processing device 10 includes a learning unit 11 and a super-resolution unit 12 as functional elements.

The learning unit 11 is a functional element that autonomously generates a neural network for implementing super-resolution. The learning unit 11 learns the procedure of super-resolution while processing datasets to generate a neural network that is assumed to be optimal. "Dataset" is a set of combinations of input data and ground truth data that should be obtained from this input data. In this specification, a neural network that is assumed to be optimal is simply referred to as "optimal neural network". It should be noted that this "optimal neural network" is not necessarily "optimal in actuality".

A neural network model that is used for computation in the learning unit 11 is not limited. In this embodiment, the learning unit 11 applies a residual learning method in a neural network mode, called ResNet, which is a type of Convolutional Neural Network (CNN). ResNet learns a residual f(x) of subtracting input from output, adds the residual f(x) to input x and thereby obtains output y, rather than calculating output y from input x. "Residual" is a difference between output and input, and therefore "residual" may be referred to instead as "difference".

The learning unit 11 includes an acquisition unit 13, a residual calculation unit 14, an image generation unit 15, and a parameter update unit 16.

The acquisition unit 13 is a functional element that acquires a dataset. The dataset may contain training data for allowing the image processing device 10 to learn an optimal neural network and test data for testing the accuracy of a neural network.

The dataset in this embodiment is a plurality of (e.g., a large number of) combinations of an input image, which is an image on which super-resolution is to be performed, and a ground truth image, which is an image that should be obtained from this input image. The dataset contains a combination of an input image and a ground truth image with higher resolution than the input image, and, in this case, the input image is a low-resolution image, and the ground truth image is a high-resolution image. The dataset may further contain a combination of an input image and a ground truth image both with high resolution (a combination where an input image and a ground truth image have the same resolution). The reason for also using a combination where both of an input image and a ground truth image have high resolution is to prevent the situation where, when an input image is a high-resolution image, over-learning of the input image occurs, which causes an unclear image to be output. In any case, the resolution of a ground truth image is equal to or higher than the resolution of an input image.

A method for preparing a dataset is not particularly limited. For example, a dataset may be prepared by using an image library, which is used for machine learning for super-resolution. Examples of this library are Set5, Set14 and BSD100. An input image can be obtained by compressing an image in the library and enlarging the compressed image to its original size, for example.

The residual calculation unit 14 is a functional element that generates an image residual from an input image by using the structure of ResNet. "Image residual" is an estimation result of a residual (difference) between an input image and an output image (high-resolution image obtained by performing super-resolution on an input image).

The image generation unit 15 is a functional element that generates a high-resolution image with higher resolution than an input image by applying an image residual to the input image. To be specific, the image generation unit 15 generates a high-resolution image by adding an input image and an image residual together for each element.

The parameter update unit 16 is a functional element that updates a parameter of a neural network. The parameter update unit 16 calculates an error of a high-resolution image with respect to a ground truth image (difference between a high-resolution image and a ground truth image), and updates a parameter (e.g., weight) of a neural network based on this error. A method for updating a parameter is not limited, and the parameter update unit 16 may update a parameter by using backpropagation. Backpropagation is a technique that corrects the weight of each neuron so as to reduce local errors, propagating from the output side to the input side.

The learning unit 11 generates an optimal neural network by learning a parameter (e.g., weight) of a neural network, while processing each input image and updating the parameter of the neural network (i.e., repeating learning). In this embodiment, a super-resolution unit 12 uses the optimal neural network.

The super-resolution unit 12 is a functional element that processes an input image whose ground truth is unknown by using the neural network generated by the learning unit 11, and thereby generates a high-resolution image with higher resolution than the input image. The super-resolution unit 12 includes an acquisition unit 13, a residual calculation unit 14, and an image generation unit 15. The functions of the acquisition unit 13, the residual calculation unit 14 and the image generation unit 15 are common between the learning unit 11 and the super-resolution unit 12.

The acquisition unit 13 is a functional element that acquires an input image, which is an image on which super-resolution is to be performed. For example, the acquisition unit 13 acquires a low-resolution image whose resolution is to be increased as an input image. The residual calculation unit 14 generates an image residual from the input image by using the neural network generated by the learning unit 11. The image generation unit 15 generates a high-resolution image with higher resolution than the input image by applying the image residual to the input image. The image generation unit 15 generates a high-resolution image by adding the input image and the image residual together for each element, and outputs the high-resolution image.

[Operation of Device]

The operation of the image processing device 10 and an image processing method according to this embodiment are described hereinafter with reference to FIGS. 4 to 8.

Figure 4:
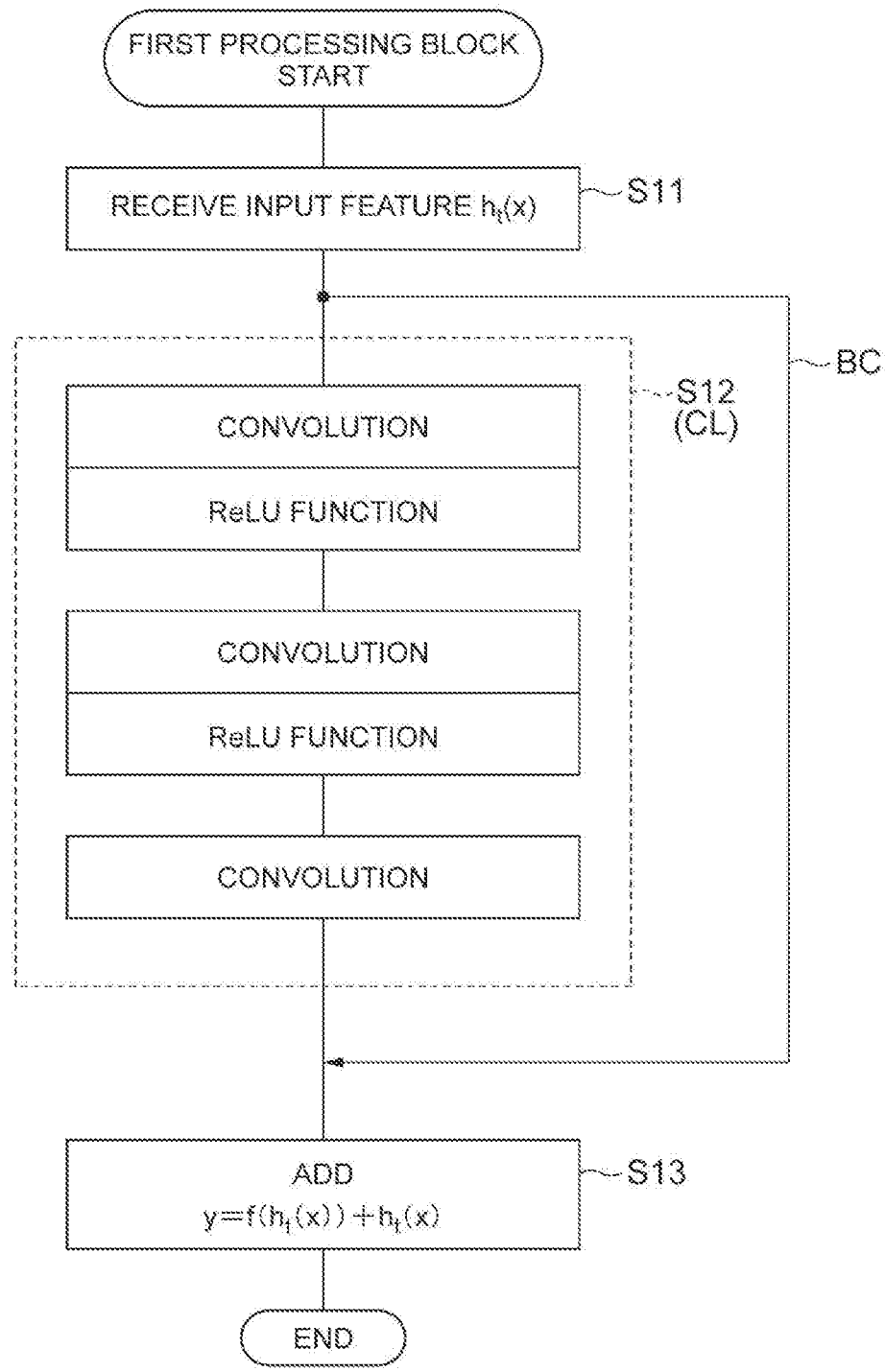
FIG. 4 is a flowchart showing a first processing block of a neural network.
Figure 5:
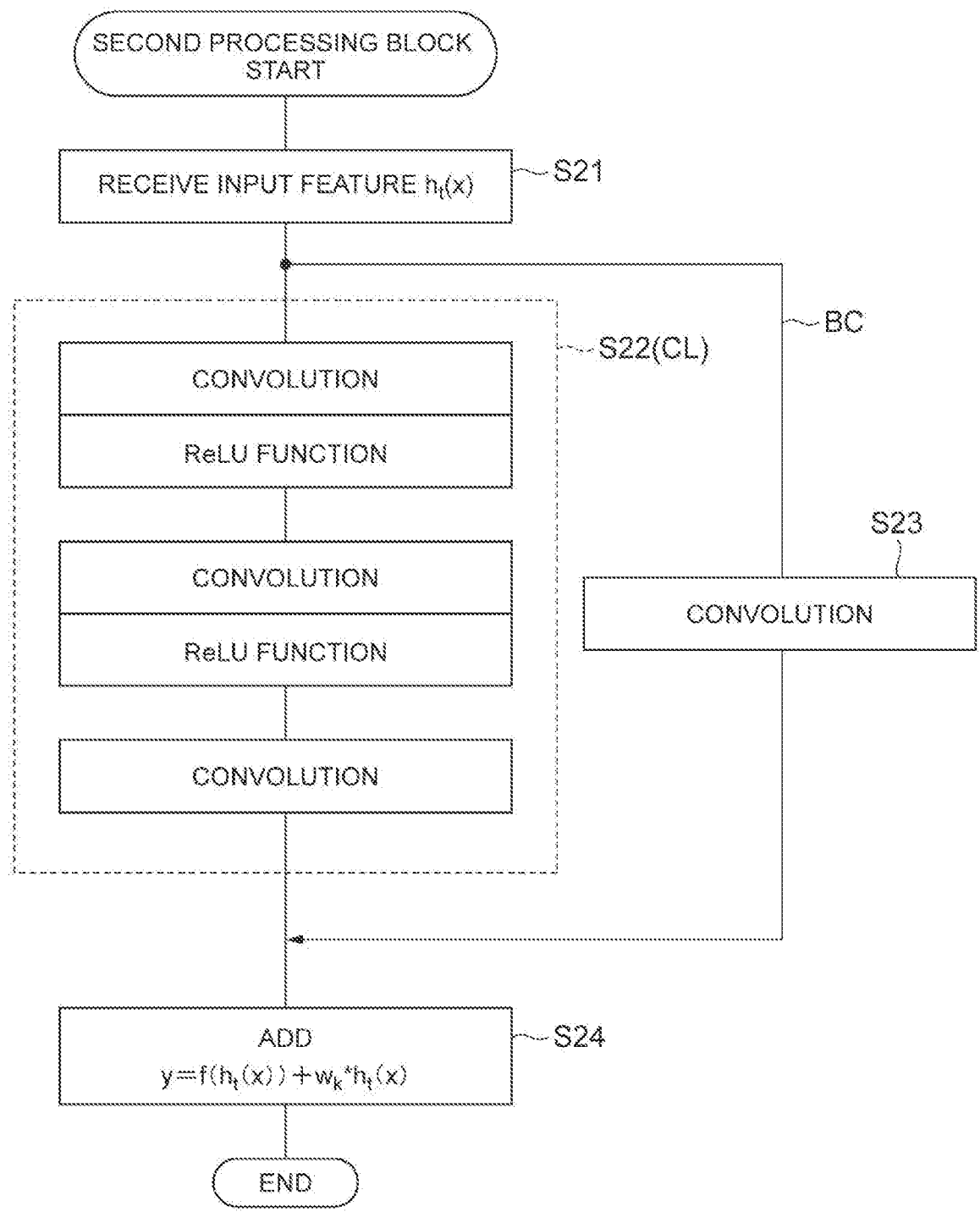
FIG. 5 is a flowchart showing a second processing block of a neural network.

Two types of processing blocks, which are basic units of a neural network used in the learning unit 11 and the super-resolution unit 12 (i.e., a neural network based on ResNet), are described with reference to FIGS. 4 and 5. Those processing blocks are referred to also as "residual blocks". Both of the processing blocks involve a convolutional layer CL and a bypass connection BC. "Convolutional layer" is processing that calculates a residual by performing convolution on input. "Bypass connection" is processing that lets input pass without any change, which is also called "shortcut connection." FIG. 4 is a flowchart showing a first processing block, and FIG. 5 is a flowchart showing a second processing block.

In the first processing block, the residual calculation unit 14 receives an input feature (first input feature) $h_t(x)$ (Step S11). "Input feature" is data indicating a certain feature of an input image and being input to the convolutional layer. Because, in the CNN, input and output data to and from the convolutional layer is also called "feature map", an input feature can be referred to also as a feature map input to the convolutional layer. Conceptually, an input feature is the same as an input image. Accordingly, stated differently, $h_t(x)$ indicates an input image, and the first processing block receives the input image.

Next, the residual calculation unit 14 processes the input feature $h_t(x)$ in a convolutional layer (first convolutional layer) CL to calculate a feature residual (first feature residual) $f(h_t(x))$ (Step S12). "Feature residual" is an estimation result of a residual (difference) between an input image and an output image (feature map obtained by executing a processing block on the input feature). The residual calculation unit 14 calculates the residual $f(h_t(x))$ by performing convolution and ReLU (Rectified Linear Unit) function on the input feature $h_t(x)$. For example, the residual $f(h_t(x))$ may be defined by the following equation, where w indicates a weight.

$$f(h_t(x))=w_{t+3}*(\max(0,w_{t+2}*\max(0,w_{t+1}*h_t(x))))$$

"Convolution" is an operation that applies a filter (kernel) with a predetermined size (e.g., 3×3) to input data. To be specific, a feature map is generated by repeating processing that multiplies a filter element by a corresponding element in input data and figures out a sum, while shifting the filter one pixel by one pixel. The ReLU function is an activating function that outputs input as is when the input is more than 0, and outputs 0 when the input is equal to or less than 0.

In the example shown in FIG. 4, the convolutional layer CL includes two combinations of convolution and ReLU function and one convolution; however, the structure of the convolutional layer CL is not limited thereto. For example, the number of combinations of convolution and ReLU function in the convolutional layer CL may be one or three or more.

Then, the residual calculation unit 14 applies the feature residual $f(h_t(x))$ to the input feature $h_t(x)$ to generate an output feature (first output feature) y. To be specific, the residual calculation unit 14 adds the feature residual $f(h_t(x))$ and the input feature $h_t(x)$ together for each element to generate the output feature y (Step S13). This is represented as $y=f(h_t(x))+h_t(x)$.

If processing blocks of neural networks are composed only of the first processing blocks, because all processing blocks involve the bypass connection, all gradients may be 0 in the convolutional layer, which can hinder the progress of machine learning. In this embodiment, in order to prevent such a situation and promote the suitable progress of machine learning, the convolution operation is implemented also in the bypass connection in at least some of the processing blocks. A processing block where the bypass connection is adopted in a modified form is the second processing block. The second processing block is different from the first processing block in that convolution is placed in the middle of the bypass connection BC.

In the second processing block, the residual calculation unit 14 receives an input feature (second input feature) $h_r(x)$ (Step S21). As described earlier, because an input feature is conceptually the same as an input image, it can be said that $h_r(x)$ indicates an input image and that the second processing block receives the input image. The residual calculation unit 14 processes the input feature $h_r(x)$ in a convolutional layer (second convolutional layer) CL to calculate a feature residual (second feature residual) $f(h_r(x))$ (Step S22). The processing in Steps S21 and S22 is the same as the processing in Steps S11 and S12 in the first processing block.

Further, the residual calculation unit 14 performs at least one convolution on the input feature $h_r(x)$ that passes through the bypass connection BC to obtain a convolved input feature $(w_k * h_r(x))$ from the input feature $h_r(x)$ (Step S23). Then, the residual calculation unit 14 applies the feature residual $f(h_r(x))$ to the convolved input feature $(w_k * h_r(x))$ to generate an output feature (second output feature) y. To be specific, the residual calculation unit 14 adds the feature residual $f(h_r(x))$ and the convolved input feature $(w_k * h_r(x))$ together for each element to generate the output feature y (Step S24). This is represented as $y=f(h_r(x))+(w_k * h_r(x))$. In this manner, by compulsorily convolving the input feature based on the input image (in other words, by compulsorily convolving the input image), it is possible to prevent the situation where all gradients are 0, which enables the suitable progress of machine learning.

The structure of the second processing block is not limited to the example of FIG. 5. For example, the number of combinations of convolution and ReLU function in the convolutional layer CL may be one or three or more, just like in the first processing block. A convolution procedure in the bypass connection BC is not limited to the example of FIG. 5, and the bypass connection BC may further involve a combination of convolution and ReLU function, for example. When the bypass connection BC involves only one convolution as shown in the example of FIG. 5, it is possible to suppress an increase in processing time and prevent the situation where all gradients are 0.

Figure 6:
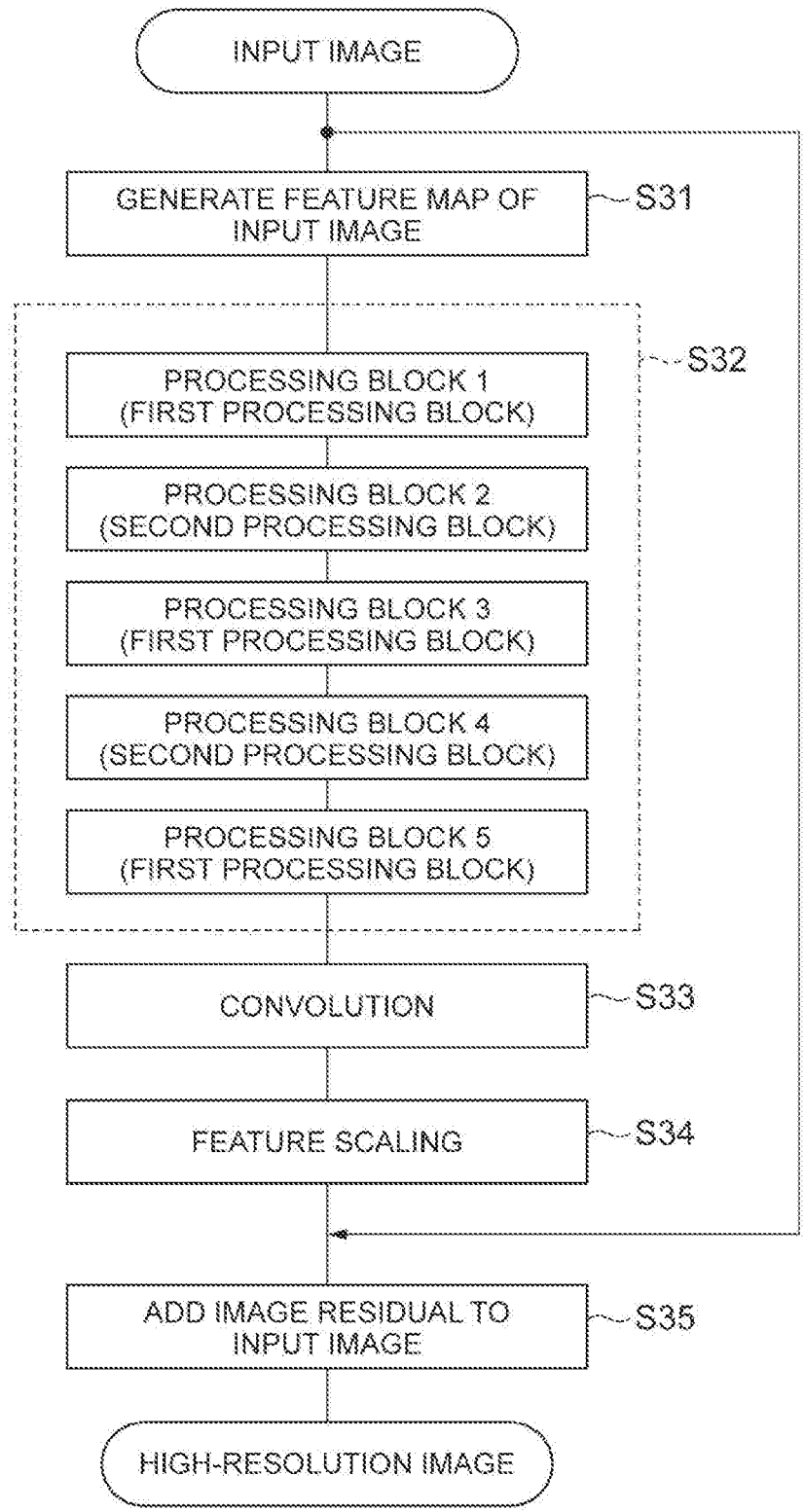
FIG. 6 is a flowchart showing an example of a neural network.

FIG. 6 is a flowchart showing an example of a neural network that includes the second processing block. This process is performed in both of the learning unit 11 and the super-resolution unit 12.

First, the residual calculation unit 14 performs convolution and ReLU function on an input image to generate a feature map indicating the feature of the input image (Step S31). For example, the residual calculation unit 14 performs convolution where the filter size is 3×3 and the number of channels is 64 to generate the feature map.

Next, the residual calculation unit 14 processes the feature map by using the second processing block at least once (Step S32). In the case of using a plurality of processing blocks, those processing blocks are connected in series, and therefore the output feature y obtained in a certain processing block is processed as the input feature (input image) $h_r(x)$ in the next processing block.

FIG. 6 shows an example in which the residual calculation unit 14 executes the first processing block and the second processing block alternately. In this example, processing blocks 1, 3 and 5 are the first processing block, and processing blocks 2 and 4 are the second processing block. The order of executing the processing blocks, however, is not limited thereto. For example, the processing blocks 1, 3 and 5 may be the second processing block, and processing blocks 2 and 4 may be the first processing block. In any case, by executing two types of processing blocks alternately, it is possible to implement high accuracy super-resolution with a reduced computation time.

It is not necessary to execute the first processing block and the second processing block alternately. For example, the residual calculation unit 14 may execute the first processing block and the second processing block in a random order. Alternatively, the residual calculation unit 14 may execute only the second processing block one or more times, without using the first processing block.

FIG. 6 shows an example in which the residual calculation unit 14 executes five processing blocks; however, the number of processing blocks to be executed is not limited, and it may be 7, 9, or 10 or more, for example.

In any case, the residual calculation unit 14 obtains an output feature by executing one or more processing blocks including at least one second processing block. Then, the residual calculation unit 14 performs convolution on the output feature and thereby corrects the dimension of the feature map to fit the input image (Step S33). For example, the residual calculation unit 14 performs convolution using a single filter with a size of 3×3.

Then, the residual calculation unit 14 performs feature scaling on the feature map whose dimension is corrected to generate an image residual with respect to the input image (Step S34). The feature scaling is processing that multiplies all elements of the feature map corresponding to all pixels of the input image by a common coefficient λ. By setting the coefficient λ so as to fit the distribution of image residuals, machine learning converges efficiently, which enables the reduction of a computation time.

After that, the image generation unit 15 adds the image residual to the input image (to be more specific, adds the input image and the image residual together for each element) to generate a high-resolution image (Step S35).

Figure 7:
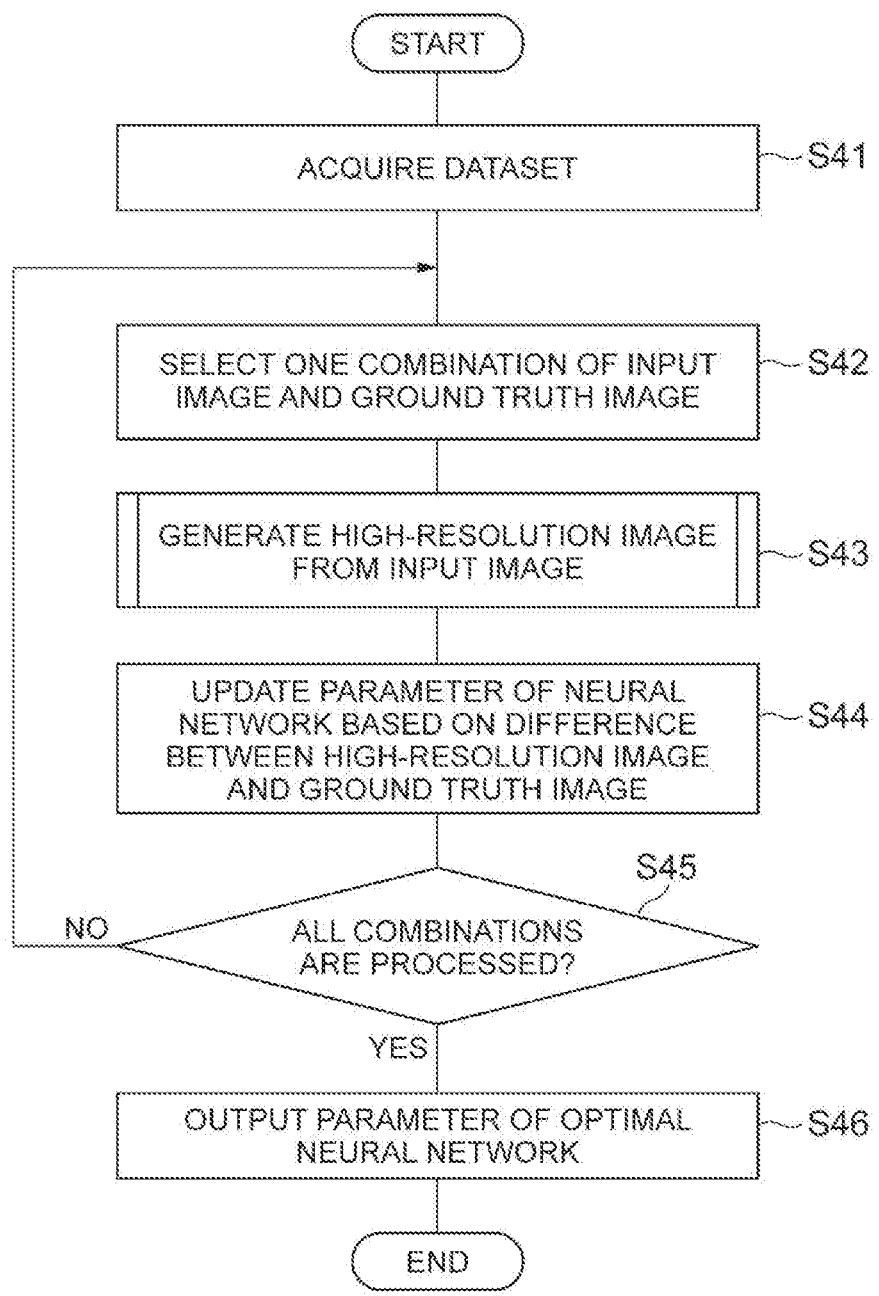
FIG. 7 is a flowchart showing processing by a learning unit of the image processing device according to the embodiment.

FIG. 7 is a flowchart showing processing by the learning unit 11. First, the acquisition unit 13 acquires a dataset (Step S41). A method for acquiring a dataset is not limited. For example, the acquisition unit 13 may acquire a dataset by accessing an image database that stores a dataset. Note that the image database may be a separate device from the image processing device 10 or a part of the image processing device 10. Alternatively, the acquisition unit 13 may acquire a dataset that is input or designated by a user of the image processing device 10. Alternatively, the acquisition unit 13 may acquire a dataset from another computer. The acquisition unit 13 then selects, from the dataset, one combination of an input image and a ground truth image as the data to be processed (Step S42).

Then, the residual calculation unit 14 and the image generation unit 15 generate a high-resolution image from the selected input image by the processing (neural network) shown in FIG. 6 (Step S43). Step S43 corresponds to Steps S31 to S35 shown in FIG. 6. After that, the parameter update unit 16 calculates a difference between the generated high-resolution image and the selected ground truth image, and updates the parameter of the neural network based on the difference (Step S44). The learning unit 11 repeats the processing of Steps S42 to S44, while changing a combination of an input image and a ground truth image, until all the combinations in the dataset are processed (see Step S45). Finally, the learning unit 11 outputs a parameter (e.g., weight) of an optimal neural network (Step S46). In this embodiment, the super-resolution unit 12 uses the neural network based on this parameter.

Figure 8:
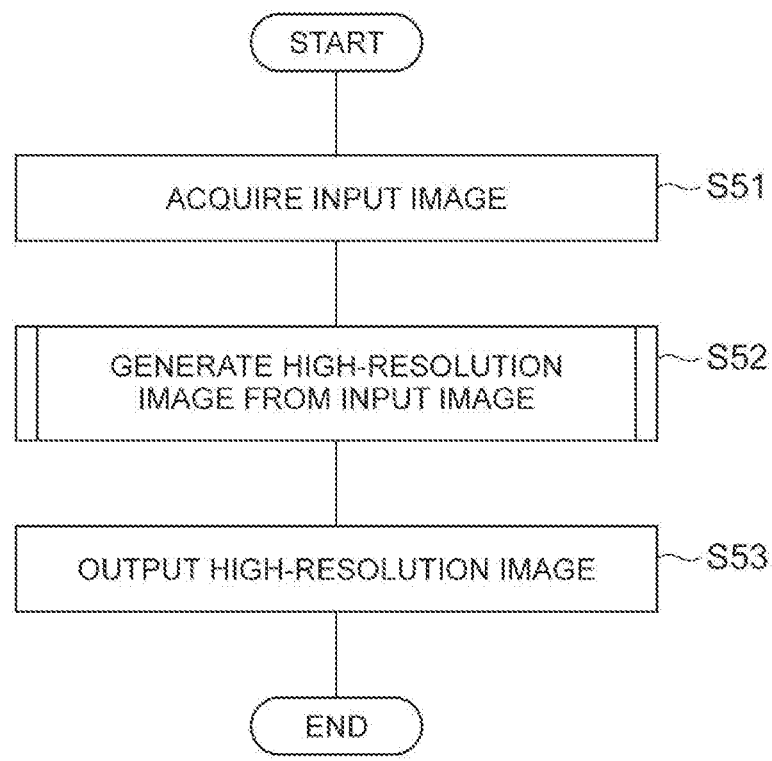
FIG. 8 is a flowchart showing processing by a super-resolution unit of the image processing device according to the embodiment.

FIG. 8 is a flowchart showing processing by the super-resolution unit 12. First, the acquisition unit 13 acquires an input image (Step S51). A method for acquiring an input image is not limited, just like in the learning unit 11. For example, the acquisition unit 13 may read an input image from an image database, acquire an input image input or designated by a user, or receive an input image from another computer. Then, the residual calculation unit 14 and the image generation unit 15 generate a high-resolution image from the selected input image by the processing (neural network) shown in FIG. 6 (Step S52). Step S52 corresponds to Steps S31 to S35 shown in FIG. 6, and it is thus the same processing as Step S43 in FIG. 7. In the super-resolution unit 12, however, the residual calculation unit 14 uses the optimal neural network generated by the learning unit 11. Finally, the image generation unit 15 outputs the generated high-resolution image (Step S53). A method for outputting the high-resolution image is not limited. For example, the image generation unit 15 may store the high-resolution image into a predetermined database, transmit it to another computer, or display it on a monitor.

[Program]

Figure 9:
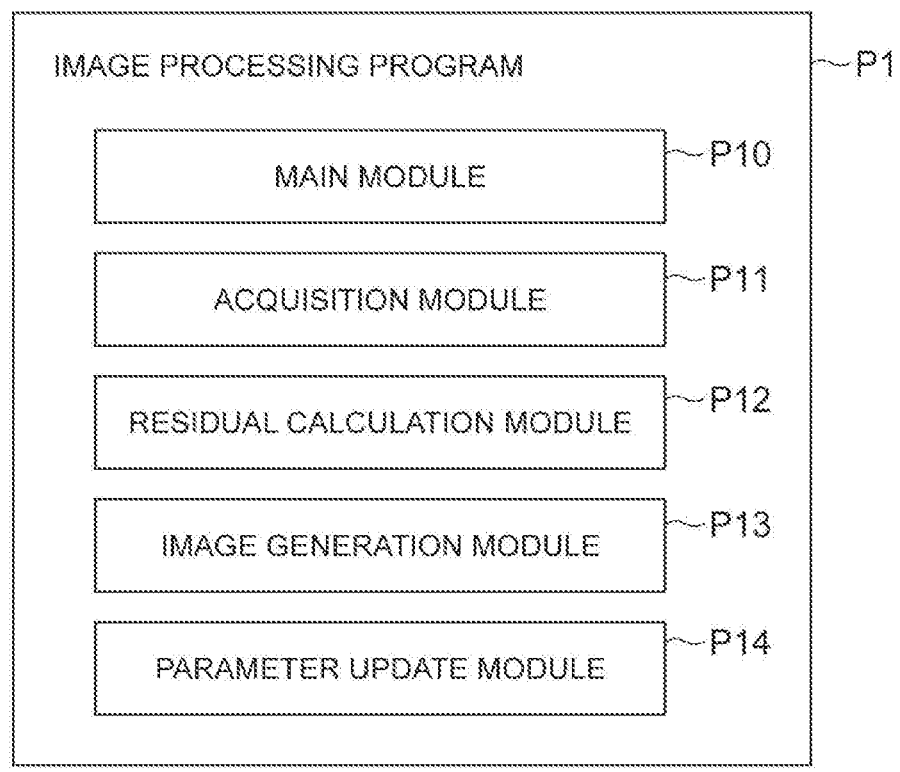
FIG. 9 is a view showing the configuration of an image processing program according to an embodiment.

An image processing program P1 that causes a computer to function as the image processing device 10 is described hereinafter with reference to FIG. 9. FIG. 9 is a view showing the configuration of the image processing program P1.

The image processing program P1 includes a main module P10, an acquisition module P11, a residual calculation module P12, an image generation module P13, and a parameter update module P14. The main module P10 is a part that exercises control over neural network generation and super-resolution. The acquisition unit 13, the residual calculation unit 14, the image generation unit 15 and the parameter update unit 16 are implemented respectively by executing the acquisition module P11, the residual calculation module P12, the image generation module P13 and the parameter update module P14. The acquisition module P11, the residual calculation module P12, the image generation module P13 are used for both of the learning unit 11 and the super-resolution unit 12.

The image processing program P1 is provided in the form of being recorded in a static manner on a tangible recording medium such as CD-ROM, DVD-ROM or semiconductor memory, for example. Alternatively, the image processing program P may be provided as a data signal superimposed onto a carrier wave through a communication network.

[Advantageous Effects]

As described above, an image processing device according to one aspect of the present invention is an image processing device including a processor, the processor executes a step of acquiring an input image, a step of calculating a feature residual by processing the input image in a convolutional layer, a step of performing at least one convolution on the input image, a step of generating an output feature by applying the feature residual to the convolved input image, and a step of generating an image residual based on the output feature, and the image residual is applied to the input image, and thereby a high-resolution image with higher resolution than the input image is generated.

An image processing method according to one aspect of the present invention is an image processing method performed by an image processing device including a processor, the method including a step of acquiring an input image, a step of calculating a feature residual by processing the input image in a convolutional layer, a step of performing at least one convolution on the input image, a step of generating an output feature by applying the feature residual to the convolved input image, and a step of generating an image residual based on the output feature, wherein the image residual is applied to the input image, and thereby a high-resolution image with higher resolution than the input image is generated.

An image processing program according to one aspect of the present invention causes a computer to execute a step of acquiring an input image, a step of calculating a feature residual by processing the input image in a convolutional layer, a step of performing at least one convolution on the input image, a step of generating an output feature by applying the feature residual to the convolved input image, and a step of generating an image residual based on the output feature, wherein the image residual is applied to the input image, and thereby a high-resolution image with higher resolution than the input image is generated.

In the above aspects, processing that performs convolution on an input image and applies a feature residual to the convolved input image is performed without exception. By performing compulsory convolution of an input image, it is possible to prevent the situation where all gradients are 0, and it is therefore possible to achieve machine learning capable of performing super-resolution even when a difference in resolution between an input image and an output image is small.

To be specific, processing that performs convolution on an input feature and applies a feature residual (residual of an input feature) to the convolved input feature is executed without exception. By performing compulsory convolution of an input feature, it is possible to prevent the situation where all gradients are 0, and it is therefore possible to achieve machine learning capable of performing super-resolution even when a difference in resolution between an input image and an output image is small.

In the image processing device according to another aspect, the processor may generate the image residual by using a neural network including a first processing block and a second processing block, and the first processing block may include a step of calculating a first feature residual by processing a first input feature based on the input image in a first convolutional layer, and a step of generating a first output feature by applying the first feature residual to the first input feature, and the second processing block may include a step of calculating a second feature residual by processing a second input feature based on the input image in a second convolutional layer, a step of performing at least one convolution on the second input feature, and a step of generating a second output feature by applying the second feature residual to the convolved second input feature.

By using both of processing that applies a feature residual to an input feature (first processing block) and processing that applies a feature residual after convolving the input feature (second processing block), it is possible to satisfactorily increase the resolution of the input image while preventing an increasing in processing time of super-resolution.

In the image processing device according to another aspect, the processor may execute the first processing block and the second processing block alternately. By executing the two types of processing blocks alternately with each other, it is possible to implement highly accurate super-resolution with a reduced computation time.

An experimental result regarding the order of executing two types of processing blocks is described hereinbelow. The image processing device 10 according to the above-described embodiment was constructed, and the accuracy of super-resolution in each pattern was tested, changing the order of executing two types of processing blocks. Set5 was used as the image library. An image in this library was compressed, and the compressed image was enlarged to its original size, and thereby a low-resolution input image was obtained. To be specific, three input images (low-resolution input images) were obtained from one library image by compressing the library image to ½, ⅓ or ¼. The library image corresponds to a ground truth image (high-resolution image).

For the order of executing the first and second processing blocks, the following seven patterns were set. "0" indicates the first processing block, "1" indicates the second processing block, and the sequence of numbers indicates the flow of processing. For example, the pattern 3 indicates that, after the second processing block is executed two times in a row, the first processing block is executed three times in a row. Further, the patterns 5 and 6 both indicate that the first processing block and the second processing block are executed alternately with each other. In all patterns, the number of processing blocks involved in the neural network was set to 5. Because the pattern 1 does not include the second processing block, it is a comparative example.

Pattern 1: 00000
Pattern 2: 00100
Pattern 3: 11000
Pattern 4: 10001
Pattern 5: 01010
Pattern 6: 10101
Pattern 7: 11111

Other settings regarding machine learning were as follows.

CNN using stochastic gradient descent (SGD)
Momentum=0.9
Weight decay=$10^{-4}$
Gradient clipping threshold=1.0
Learning rate: initially 1; changed to $\frac{1}{10}$ in every ten epochs
Initial value of coefficient in feature scaling: 0.1

A result of super-resolution by machine learning was evaluated with peak signal-to-noise ratio (PSNR). The following Table 1 shows a PSNR value in each pattern (in decibels (dB)), and the image quality is evaluated to be higher as the value is greater. "X2", "X3", and "X4" respectively indicate an input image of ½ compression, an input image of ⅓ compression, and an input image of ¼ compression, respectively. This experiment shows that the effect of learning is higher as the number of second processing blocks involved is larger. It also shows that, in the case where the number of second processing blocks is the same, the effect of learning is higher when the second processing blocks are arranged alternately. Although not shown in Table 1, a processing time was long when the number of second processing blocks was large. In this view, executing two types of processing blocks alternately is a technique to implement highly accurate super-resolution with a reduced computation time.

TABLE 1

|    | 00000 | 00100 | 11000 | 10001 | 01010 | 10101 | 11111 |
|----|-------|-------|-------|-------|-------|-------|-------|
| X2 | 37.55 | 37.58 | 37.56 | 37.59 | 37.59 | 37.58 | 37.60 |
| X3 | 33.75 | 33.74 | 33.74 | 33.77 | 33.78 | 33.80 | 33.79 |
| X4 | 31.36 | 31.39 | 31.42 | 31.43 | 31.44 | 31.44 | 31.45 |

In the image processing device according to another aspect, a processor may perform feature scaling on an output feature and thereby generate an image residual. Machine learning converges efficiently by this feature scaling, and it is thus possible to reduce a computation time.

Modified Example

An embodiment of the present invention is described in detail above. However, the present invention is not limited to the above-described embodiment. Various changes and modifications may be made to the present invention without departing from the scope of the invention.

Although the image processing device includes the learning unit 11 and the super-resolution unit 12 in the above embodiment, the image processing device may include only one of the learning unit and the super-resolution unit. In the case where the image processing device includes the learning unit without including the super-resolution unit, the learning unit may output an optimal neural network, and another computer may perform super-resolution by using this optimal neural network. In the case where the image processing device includes the super-resolution unit without including the learning unit, the super-resolution unit may acquire a learned neural network from another computer and perform super-resolution by using this neural network. In either case, the image processing device (A) acquires an input image, (B) calculates a feature residual by processing the input image in a convolutional layer, (C) performs at least one convolution on the input image, (D) generates an output feature by applying the feature residual to the convolved input image, and (E) generates an image residual based on the output feature. The image residual is applied to the input image, and thereby a high-resolution image with higher resolution than the input image is generated.

The image processing device may perform processing up to generating an image residual, and another computer may apply this image residual to an input image to generate a high-resolution image. Thus, the generation of a high-resolution image is not essential processing of the image processing device.

The procedure of the image processing method that is performed by at least one processor is not limited to the example shown in the above-described embodiment. For example, some of the steps (processing) described above may be omitted, or those steps may be performed in a different order. Further, any two or more steps of the steps described above may be combined, or some of the steps may be modified or eliminated. Alternatively, another step may be performed in addition to the steps described above.

REFERENCE SIGNS LIST

10 . . . image processing device, 11 . . . learning unit, 12 . . . super-resolution unit, 13 . . . acquisition unit, 14 . . . residual calculation unit, 15 . . . image generation unit, 16 . . . parameter update unit, CL . . . convolutional layer, BC . . . bypass connection, P1 . . . image processing program, P10 . . . main module, P11 . . . acquisition module, P12 . . . residual calculation module, P13 . . . image generation module, P14 . . . parameter update module

The invention claimed is:

1. An image processing device comprising:
at least one memory configured to store computer program code; and
at least one processor configured to operate according to the computer program code, the computer program code including:
acquiring code configured to cause at least one of the at least one processor to acquire an input image;
calculating code configured to cause at least one of the at least one processor to calculate a feature residual by processing the input image in a convolutional layer;
convoluting code configured to cause at least one of the at least one processor to perform at least one convolution on the input image in a bypass connection;
output code configured to cause at least one of the at least one processor to generate an output feature by applying the feature residual to the convolved input image in the bypass connection; and
image generating code configured to cause at least one of the at least one processor to generate an image residual based on the output feature, and
applying code configured to cause at least one of the at least one processor to apply the image residual to the input image, and thereby generate a high-resolution image with higher resolution than the input image.

2. The image processing device according to claim 1, wherein
the computer program code is further configured to cause at least one of the at least one processors to generate the image residual by using a neural network including a first processing block and a second processing block, the first processing block:
calculates a first feature residual by processing a first input feature based on the input image in a first convolutional layer; and
generates a first output feature by applying the first feature residual to the first input feature, and
the second processing block:
calculates a second feature residual by processing a second input feature based on the input image in a second convolutional layer;
performs at least one convolution on the second input feature; and
generates a second output feature by applying the second feature residual to the convolved second input feature.

3. The image processing device according to claim 2, wherein the computer program code is further configured to cause at least one of the at least one processors to execute the first processing block and the second processing block alternately.

4. The image processing device according to claim 1, wherein the computer program code is further configured to cause at least one of the at least one processors to generate the image residual by performing feature scaling on the output feature.

5. An image processing method performed by an image processing device including a processor, the method comprising:
acquiring an input image;
calculating a feature residual by processing the input image in a convolutional layer;
performing at least one convolution on the input image in a bypass connection;
generating an output feature by applying the feature residual to the convolved input image in the bypass connection; and
generating an image residual based on the output feature, wherein
the image residual is applied to the input image, and thereby a high-resolution image with higher resolution than the input image is generated.

6. A non-transitory recording medium storing an image processing program configured to cause a computer to:
acquire an input image;
calculate a feature residual by processing the input image in a convolutional layer;
perform at least one convolution on the input image in a bypass connection;
generate an output feature by applying the feature residual to the convolved input image in the bypass connection; and
generate an image residual based on the output feature, wherein
the image residual is applied to the input image, and thereby a high-resolution image with higher resolution than the input image is generated.

* * * * *